(12) United States Patent
Birnbaum et al.

(10) Patent No.: US 10,019,061 B2
(45) Date of Patent: Jul. 10, 2018

(54) SYSTEMS AND METHODS FOR HAPTIC MESSAGE TRANSMISSION

(75) Inventors: David M. Birnbaum, Oakland, CA (US); Chris Ullrich, Ventura, CA (US)

(73) Assignee: Immersion Corporation, San Jose, CA (US)

(*) Notice: Subject to any disclaimer, the term of this patent is extended or adjusted under 35 U.S.C. 154(b) by 428 days.

(21) Appl. No.: 12/502,795

(22) Filed: Jul. 14, 2009

(65) Prior Publication Data

US 2010/0017489 A1  Jan. 21, 2010

Related U.S. Application Data

(60) Provisional application No. 61/080,978, filed on Jul. 15, 2008, provisional application No. 61/080,981, (Continued)

(51) Int. Cl.
*G06F 3/0481* (2013.01)
*G06F 3/01* (2006.01)
(Continued)

(52) U.S. Cl.
CPC ............ *G06F 3/016* (2013.01); *G06F 1/1613* (2013.01); *G06F 3/017* (2013.01); *G06F 3/0346* (2013.01); *G06F 3/041* (2013.01); *G06F 3/0488* (2013.01); *G06F 3/04842* (2013.01); *G06F 3/04845* (2013.01); *G06F 3/04883* (2013.01); *G06F 3/04886* (2013.01); *G06F 3/167* (2013.01); *G08B 6/00* (2013.01); *H04M 1/72544* (2013.01); *H04M 1/72547* (2013.01); *H04M 1/72572* (2013.01); *H04M 19/047* (2013.01); *H04W 4/206* (2013.01);
(Continued)

(58) Field of Classification Search
CPC .. G06F 3/0482; G06F 3/0481; G06F 3/04883; G06F 3/016
USPC ....... 715/702, 708, 781, 773, 810, 825, 835, 715/861, 863, 864; 345/173
See application file for complete search history.

(56) References Cited

U.S. PATENT DOCUMENTS 4,873,623 A * 10/1989 Lane et al. ...................... 700/83
5,666,499 A    9/1997 Baudel et al.
(Continued)

FOREIGN PATENT DOCUMENTS

CN     1585922 A    2/2005
CN   101118469 A    2/2008
(Continued)

OTHER PUBLICATIONS

International Search Report and Written Opinion dated Feb. 11, 2010 for corresponding International Application No. PCT/US2009/050569.
(Continued)

*Primary Examiner* — Tuyetlien T Tran
(74) *Attorney, Agent, or Firm* — Kilpatrick Townsend & Stockton LLP

(57) ABSTRACT

Systems and methods for haptic message transmission are disclosed. For example, one disclosed method includes the steps of receiving a sensor signal from a sensor configured to sense a physical interaction with a messaging device, determining a virtual force based at least in part on the sensor signal, and applying the virtual force to a virtual message object within a virtual message environment.

20 Claims, 7 Drawing Sheets

Related U.S. Application Data filed on Jul. 15, 2008, provisional application No. 61/080,985, filed on Jul. 15, 2008, provisional application No. 61/080,987, filed on Jul. 15, 2008, provisional application No. 61/148,312, filed on Jan. 29, 2009, provisional application No. 61/181,280, filed on May 26, 2009.

(51) Int. Cl.

| | | |
|---|---|---|
| *H04M 1/725* | (2006.01) | |
| *G06F 1/16* | (2006.01) | |
| *G06F 3/0346* | (2013.01) | |
| *H04M 19/04* | (2006.01) | |
| *H04W 4/20* | (2018.01) | |
| *G08B 6/00* | (2006.01) | |
| *G06F 3/041* | (2006.01) | |
| *G06F 3/0484* | (2013.01) | |
| *G06F 3/0488* | (2013.01) | |
| *G06F 3/16* | (2006.01) | |

(52) U.S. Cl.
CPC ............ *G06F 2200/1637* (2013.01); *G06F 2203/014* (2013.01); *G06F 2203/04101* (2013.01); *G06F 2203/04104* (2013.01); *G06F 2203/04106* (2013.01); *G06F 2203/04808* (2013.01); *H04M 2250/12* (2013.01)

(56) References Cited

U.S. PATENT DOCUMENTS

| | | | |
|---|---|---|---|
| 5,844,547 A | 12/1998 | Minakuchi et al. | |
| 6,573,883 B1 | 6/2003 | Bartlett | |
| 6,639,582 B1 | 10/2003 | Shrader | |
| 6,803,924 B1 | 10/2004 | Snibbe et al. | |
| 6,903,723 B1* | 6/2005 | Forest | 345/157 |
| 6,963,762 B2 | 11/2005 | Kaaresoja et al. | |
| 7,081,882 B2* | 7/2006 | Sowden et al. | 345/156 |
| 7,176,886 B2 | 2/2007 | Marvit et al. | |
| 7,191,191 B2 | 3/2007 | Peurach et al. | |
| 7,450,110 B2* | 11/2008 | Shahoian et al. | 345/173 |
| 7,468,573 B2 | 12/2008 | Dai et al. | |
| 7,548,232 B2* | 6/2009 | Shahoian et al. | 345/173 |
| 7,721,968 B2 | 5/2010 | Wigdor | |
| 7,788,032 B2 | 8/2010 | Moloney | |
| 7,810,247 B2 | 10/2010 | Fourquin et al. | |
| 8,123,614 B2 | 2/2012 | Kulas | |
| 8,306,576 B2 | 11/2012 | Cho et al. | |
| 9,063,571 B2 | 6/2015 | Birnbaum et al. | |
| 2001/0010513 A1 | 8/2001 | Rosenberg et al. | |
| 2001/0035854 A1 | 11/2001 | Rosenberg et al. | |
| 2001/0045941 A1 | 11/2001 | Rosenberg et al. | |
| 2002/0140625 A1 | 10/2002 | Kidney et al. | |
| 2002/0177471 A1 | 11/2002 | Kaaresoja et al. | |
| 2003/0063067 A1 | 4/2003 | Chuang | |
| 2003/0063128 A1 | 4/2003 | Salmimaa et al. | |
| 2003/0100969 A1* | 5/2003 | Jones | 700/97 |
| 2003/0128237 A1 | 7/2003 | Sakai et al. | |
| 2003/0162595 A1 | 8/2003 | Serbanescu | |
| 2004/0067780 A1 | 4/2004 | Eide et al. | |
| 2005/0052430 A1 | 3/2005 | Shahoian et al. | |
| 2005/0058268 A1 | 3/2005 | Koch et al. | |
| 2005/0093868 A1* | 5/2005 | Hinckley ........ G06F 3/011 345/502 | |
| 2005/0103863 A1 | 5/2005 | Zhu et al. | |
| 2005/0114142 A1 | 5/2005 | Asukai et al. | |
| 2005/0124412 A1* | 6/2005 | Son ............ G06N 3/006 463/30 | |
| 2005/0134561 A1 | 6/2005 | Tierling et al. | |
| 2005/0179617 A1 | 8/2005 | Matsui et al. | |
| 2005/0184696 A1 | 8/2005 | Anastas et al. | |
| 2005/0210410 A1 | 9/2005 | Ohwa | |
| 2005/0216867 A1 | 9/2005 | Marvit et al. | |
| 2005/0219211 A1* | 10/2005 | Kotzin et al. | 345/158 |
| 2006/0028453 A1* | 2/2006 | Kawabe | 345/173 |
| 2006/0061545 A1 | 3/2006 | Hughes et al. | |
| 2006/0181510 A1 | 8/2006 | Faith | |
| 2006/0241864 A1 | 10/2006 | Rosenberg | |
| 2006/0255683 A1* | 11/2006 | Suzuki et al. | 310/317 |
| 2006/0256074 A1 | 11/2006 | Krum et al. | |
| 2006/0279476 A1 | 12/2006 | Obata | |
| 2006/0279542 A1 | 12/2006 | Flack et al. | |
| 2006/0284849 A1* | 12/2006 | Grant et al. | 345/173 |
| 2007/0040810 A1* | 2/2007 | Dowe et al. | 345/173 |
| 2007/0049301 A1 | 3/2007 | Mock et al. | |
| 2007/0057913 A1 | 3/2007 | Eid et al. | |
| 2007/0066283 A1 | 3/2007 | Haar et al. | |
| 2007/0124503 A1 | 5/2007 | Ramos et al. | |
| 2007/0139366 A1 | 6/2007 | Dunko et al. | |
| 2007/0152984 A1 | 7/2007 | Ording et al. | |
| 2007/0157089 A1 | 7/2007 | Van Os et al. | |
| 2007/0168118 A1 | 7/2007 | Lappe et al. | |
| 2007/0171046 A1 | 7/2007 | Diem et al. | |
| 2007/0242056 A1 | 10/2007 | Engelhardt et al. | |
| 2007/0247442 A1 | 10/2007 | Andre et al. | |
| 2008/0020843 A1 | 1/2008 | Wolinsky | |
| 2008/0055269 A1 | 3/2008 | Lemay et al. | |
| 2008/0133336 A1 | 6/2008 | Altman et al. | |
| 2008/0143685 A1 | 6/2008 | Lee et al. | |
| 2008/0153520 A1* | 6/2008 | Kirtane | 455/466 |
| 2008/0153554 A1 | 6/2008 | Yoon et al. | |
| 2008/0168403 A1* | 7/2008 | Westerman et al. | 715/863 |
| 2008/0244681 A1* | 10/2008 | Gossweiler et al. | 725/133 |
| 2008/0287147 A1* | 11/2008 | Grant et al. | 455/466 |
| 2008/0300055 A1 | 12/2008 | Lutnick et al. | |
| 2009/0073118 A1* | 3/2009 | Yamaji et al. | 345/161 |
| 2009/0098888 A1 | 4/2009 | Yoon | |
| 2009/0100384 A1 | 4/2009 | Louch | |
| 2009/0140986 A1* | 6/2009 | Karkkainen et al. | 345/173 |
| 2009/0167509 A1* | 7/2009 | Fadell et al. | 340/407.2 |
| 2009/0167701 A1 | 7/2009 | Ronkainen | |
| 2009/0295743 A1* | 12/2009 | Nakajoh | 345/173 |
| 2009/0309825 A1 | 12/2009 | Sodergren et al. | |
| 2010/0004008 A1 | 1/2010 | Abolrous et al. | |
| 2010/0013777 A1* | 1/2010 | Baudisch et al. | 345/173 |

FOREIGN PATENT DOCUMENTS

| | | |
|---|---|---|
| EP | 0 899 650 | 3/1999 |
| EP | 0899650 | 3/1999 |
| EP | 1 401 185 | 3/2004 |
| EP | 1 728 142 | 12/2006 |
| EP | 1 731 993 | 12/2006 |
| FR | 2910160 | 6/2008 |
| GB | 2 416 962 | 2/2006 |
| JP | 05-100809 | 4/1993 |
| JP | 06-242886 A | 9/1994 |
| JP | 3085481 U | 5/2002 |
| JP | 05-152054 | 6/2005 |
| JP | 2006-201912 A | 8/2006 |
| JP | 2007-531113 | 11/2007 |
| JP | 2007-531158 | 11/2007 |
| JP | 2007-535273 | 11/2007 |
| KR | 2004-177992 | 6/2004 |
| KR | 20050104382 | 11/2005 |
| KR | 20060106010 | 10/2006 |
| KR | 20070007808 | 1/2007 |
| KR | 10-2007-0028308 | 3/2007 |
| KR | 10-0775190 | 11/2007 |
| KR | 20080058124 | 6/2008 |
| WO | WO 2003/034196 | 4/2003 |
| WO | WO 2004/044728 A2 | 5/2004 |
| WO | WO 2004/075169 A2 | 9/2004 |
| WO | 2005/103863 A2 | 11/2005 |
| WO | WO 2005/103860 | 11/2005 |
| WO | WO 2005/103862 | 11/2005 |
| WO | WO 2005/103863 | 11/2005 |
| WO | WO2006/013363 A1 | 2/2006 |
| WO | 2006/094308 A2 | 9/2006 |
| WO | WO 2008/132540 A1 | 11/2008 |
| WO | WO 2009/074185 A1 | 6/2009 |

(56) References Cited

FOREIGN PATENT DOCUMENTS

OTHER PUBLICATIONS

Biet, M. et al., Discrimination of Virtual Square Gratings by Dynamic Touch on Friction Based Tactile Displays, Haptic Interfaces for Virtual Environment and Teleoperator Systems, 2008, Symposium, IEEE, Piscataway, NJ, XP 031339918, pp. 41-48, Mar. 2008.
Dewitt, A., Designing Sonification of User Data in Affective Interaction, Master of Science Thesis Stockholm, Sweden, XP 002551466, at hppt://w3.nada.kth.se/utbildning/grukth/exjobb/rapportlistor/2007/rapporter07/de_witt_anna_07142, as available via the Internet and printed Oct. 20, 2009.
Kaaresoja, T. et al., Snap-Crackle-Pop: Tactile Feedback for Mobile Touch Screens, Proceedings of the Eurohaptics 2006, XP 002551465, at http://lsc.univ-evry.fr/{eurohaptics/upload/cd/papers/f80, as available via the Internet and printed Oct. 20, 2009.
Oakley, I. et al., Contact IM: Exploring Asynchronous Touch over Distance, Palpable Machines Research Group, Media Lab Europe, XP 007910188, at http://people.cs.vt.edu/[wangr06/touch%20review%20origization/Oak002, as available via the internet and printed Oct. 20, 2009.
Rovers, A. et al., HIM: A Framework for Haptic Instant Messaging, CHI 2004 (CHI Conference Proceedings. Human Factors in Computing Systems), XP 002464573, Vienna Austria, Apr. 2004, p. 1313-1316.
Sekiguchi, Y. et al., Haptic Interface using Estimation of Box Contents Metaphor, Proceedings of ICAT 2003, Tokyo, Japan, XP 002551467, at http://www.vrsj.org/ic-at/papers/2003/00947_00000, as available via the Internet and printed Oct. 20, 2009.
Patent Cooperation Treaty, International Search Report, International Application No. PCT/US2009/050587, dated Oct. 29, 2009.
Patent Cooperation Treaty, International Search Report, International Application No. PCT/US2009/050574, dated Oct. 29, 2009.
Patent Cooperation Treaty, International Search Report, International Application No. PCT/US2009/050564, dated Oct. 28, 2009.
Patent Cooperation Treaty, Invitation to Pay Additional Fees, Application No. PCT/US2009/050569, dated Nov. 9, 2009.
International Preliminary Report on Patentability dated Jan. 27, 2011 for corresponding International Application No. PCT/US2009/050579.
Williamson, J. et al., Shoogle: Excitatory Multimodal Interaction on Mobile Devices, CHI 2007 Proceedings-Shake, Rattle and Roll: New Forms of Input and Output, 2007, pp. 121-124, XP002549378.
Patent Cooperation Treaty, International Search Report, International Application No. PCT/US2009/050579, dated Oct. 21, 2009.
International Search Report dated Mar. 23, 2010 for International Patent Application No. PCT/US2010/022528.
Chinese Office Action dated Nov. 13, 2012 for corresponding Chinese Patent Application No. 200980127978.1.
Office Action dated Nov. 13, 2012 for corresponding U.S. Appl. No. 12/502,702.
International Preliminary Report on Patentability dated Aug. 11, 2011 for corresponding International Patent Application PCT/US2010/022528.
International Preliminary Report on Patentability dated Jan. 27, 2011 for corresponding International Patent Application PCT/US2009/050569.
International Preliminary Report on Patentability dated Jan. 27, 2011 for corresponding International Patent Application PCT/US2009/050564.
International Preliminary Report on Patentability dated Jan. 27, 2011 for corresponding International Patent Application PCT/US2009/050574.
International Preliminary Report on Patentability dated Jan. 27, 2011 for corresponding International Patent Application PCT/US2009/050587.
International Preliminary Report on Patentability dated Jan. 27, 2011 for corresponding International Patent Application PCT/US2009/050579.
Brown, L.M. and Williamson, J., "Shake2Talk: Multimodal Messaging for Interpersonal Communication," Oakley, I. and Brewster, S. (eds), HAID 2007, LNCS 4813, pp. 44-55.
Poupyrev, I. et al., "Ambient Touch: Designing Tactile Interfaces for Handheld Devices," {poup, rekimoto}@csl.sony.co.jp, shigeaki.maruyama@jp.sony.com http://www.csl.sony.co.jp/IL.
Smith, J. et al., "Communicating emotion through a haptic link: Design space and methodology," Int. J. Human-Computer Studes, 2007, 65:376-387.
Snibbe, S.S. et al., "Haptic Techniques for Media Control," Proceedings of 14th Annual ACM Symposium on User Interface Software and Technology, Orlando, Florida, Nov. 2001.
Verplank, B. et al., "The Plank: Designing a simple haptic controller." Proceedings of the Conference on New Instruments for Musical Expression, Dublin, Ireland, May 24-26, 2012.
United States Patent and Trademark Office, Office Action, U.S. Appl. No. 12/502,755, dated Apr. 25, 2012.
United States Patent and Trademark Office, Office Action, U.S. Appl. No. 12/502,647, dated Dec. 12, 2011.
Chinese Office Action dated Nov. 29, 2012 for corresponding Chinese Patent Application No. 200980127938.7.
Office Action dated Sep. 11, 2012 for corresponding U.S. Appl. No. 12/502,758.
Office Action dated Sep. 26, 2012 for corresponding U.S. Appl. No. 12/697,030.
Office Action dated Feb. 27, 2013 for corresponding U.S. Appl. No. 12/697,030.
United States Patent and Trademark Office, Office Action, U.S. Appl. No. 12/697,030, dated Jun. 3, 2013.
Notice of Reasons for Rejection, Japanese Application No. 2011-518849, dated May 28, 2013.
Chinese Office Action dated Dec. 6, 2012 for corresponding Chinese Patent Application No. 200980127939.1.
Chinese Office Action dated Jan. 31, 2013 for corresponding Chinese Patent Application No. 200980128008.3.
Japanese Patent Office, Notice of Reasons for Rejection, Application No. 2011-518856, dated Dec. 2, 2013.
Holmquist, L. et al., Smart-Its Friends: A Technique for Users to Easily Establish Connections between Smart Artefacts, Technical Note to UbiComp, 2001, pp. 1-6, XP008050420.
Sommerer, C. et al., Mobile Feelings—Wireless Communication of Heartbeat and Breath for Mobile Art, The 14th International Confernece on Artificial Reality and Telexistence (ICAT 2004), 2004, web page at http://www.interface.ufg.ac.at/christa-laurent/WORKS/PDF/ICAT04SommererReference.pdf.
European Patent Office, Extended European Search Report, European Application No. EP 14151328, dated Mar. 18, 2014.
Japanese Patent Office, Decision of Rejection, Application No. 2011-518852, dated Jul. 15, 2014.
European Patent Office, Communication pursuant to Article 94(3) EPC, Application No. 09790403, dated Jul. 30, 2014.
European Patent Office, Communication pursuant to Article 94(3) EPC, Application No. 09790406, dated Jul. 30, 2014.
European Patent Office, Communication pursuant to Article 94(3) EPC, Application No. 0790414, dated Aug. 4, 2014.
European Patent Office, Communication pursuant to Article 94(3) EPC, Application No. 09790404, dated Aug. 4, 2014.
Korean Patent Office, Notice of Preliminary Rejection, Korean Patent Application No. 10-2014-7028879, dated Jan. 21, 2015.
European Patent Office, Communication pursuant to Article 94(3) EPC, Application No. 09790406 dated May 4, 2015.
European Patent Office, Communication pursuant to Article 94(3) EPC, Application No. 9790403 dated May 4, 2015.
Japanese Patent Office, Notice of Reasons for Rejection, JP Application No. 2011-518849, dated Apr. 22, 2015.
United States Patent and Trademark Office, Office Action, U.S. Appl. No. 14/612,392 dated Oct. 5, 2015.
Japanese Patent Office, Office Action, Application No. JP 2011-518849 dated Dec. 16, 2015.

(56) References Cited

OTHER PUBLICATIONS

United States Patent and Trademark Office, Office Action, U.S. Appl. No. 14/712,358 dated Dec. 30, 2015.
United States Patent and Trademark Office, Office Action, U.S. Appl. No. 12/502,755 dated Feb. 11, 2016.
European Patent Office, Communication pursuant to Article 94(3) EPC, Application No. 09790410 dated Feb. 4, 2016.
Patent Reexamination Board of the Chinese Patent Office, Notification of Reexamination, Application No. 200980127939, dated Feb. 15, 2016.
Patent Reexamination Board of the Chinese Patent Office, Notification of Reexamination, Application No. 200980127938, dated Jan. 25, 2016.
United States Patent and Trademark Office, Office Action, U.S. Appl. No. 14/612,392 dated Aug. 24, 2016.
United States Patent and Trademark Office, Office Action, U.S. Appl. No. 14/712,358 dated Aug. 9, 2016.
Chinese Patent Reexamination Board, Decision of Reexamination, Application No. 200980127938 dated Jul. 20, 2016.
Japanese Patent Office, Final Notice of Reasons for Rejection, Application No. 2014-087038 dated Jul. 5, 2016.
Korean Patent Office, Notice of Final Rejection, Application No. 10-2011-7003491 dated Jun. 28, 2016.
European Patent Office, Communication Pursuant to Article 94(3) EPC, Application No. 09790404 dated May 31, 2016.
Japanese Patent Office, Decision of Rejection, Application No. 2014-164916 dated Apr. 5, 2016.
Korean Patent Office, Notice of Final Rejection, Application No. 10-2011-7003437, dated May 1, 2016.
Korean Patent Office, Notice of Preliminary Rejection, Application No. 10-2016-7002451 dated May 19, 2016.
Korean Patent Office, Notice of Preliminary Rejection, Application No. 10-2016-7002561 dated Apr. 29, 2016.
United States Patent and Trademark Office, Office Action, U.S. Appl. No. 12/502,755 dated Apr. 27, 2016.
United States Patent and Trademark Office, Office Action, U.S. Appl. No. 14/612,392 dated Mar. 30, 2016.
"CSCW 2002—Interactive Posters", URL:http://www.acm.org/conferences/cscw2002/cfp-posters.html, Jun. 26, 2002, pp. 1.
"CSCW 2002 Program: Interactive Posters", Available Online at:-http://oldwww.acm.org/conferences/cscw2002/prog-posters.html, Oct. 18, 2002.
U.S. Appl. No. 12/697,030, Final Office Action dated Apr. 21, 2017, 22 pages.
U.S. Appl. No. 14/198,884, Final Office Action dated Jun. 15, 2017, 11 pages.
U.S. Appl. No. 14/198,884, Non-Final Office Action dated Sep. 29, 2017, 11 pages.
U.S. Appl. No. 14/612,392, Final Office Action dated Mar. 8, 2017, 17 pages.
European Patent Office Application No. 14151307.7, Communication Pursuant to Article 94(3) EPC dated Aug. 10, 2017, 8 pages.
European Patent Office Application No. 14151328.3, Communication Pursuant to Article 94(3) EPC dated Jul. 19, 2017, 8 pages.
European Patent Office Application No. 16187932.5, Communication Pursuant to Article 94(3) EPC dated Sep. 6, 2017, 9 pages.
European Patent Office Application No. 17155928.9, Extended European Search Report dated Jul. 17, 2017, 14 pages.
European Patent Office Application No. 17158253.9, Extended European Search Report dated Sep. 27, 2017, 8 pages.
Korean Patent Office Application No. 10-2016-7027748, Notice of Final Rejection dated Jun. 30, 2017, 5 pages.
Korean Patent Office Application No. 10-2016-7026279, Notice of Last Preliminary Rejection dated May 26, 2017, 4 pages.
Korean Patent Office Application No. 10-2016-7027748, Notice of Dismissal of Amendment dated Sep. 8, 2017, 11 pages.
Korean Patent Office Application No. 10-2017-7006891, Notice of Preliminary Rejection dated May 22, 2017, 17 pages.
Korean Patent Office Application No. 10-2017-7006891, Notice of Final Rejection dated Dec. 15, 2017, 8 pages.
Korean Patent Office Application No. 10-2017-7032718, Notice of Preliminary Rejection dated Dec. 29, 2017, 6 pages.
United States Patent and Trademark Office, Office Action, U.S. Appl. No. 12/697,030 dated Oct. 31, 2016.
Korean Patent Office, Notice of Final Rejection, Application No. 10-2011-7003437 dated Sep. 5, 2016.
Korean Patent Office, Notice of Final Rejection, Application No. 10-2011-7003491 dated Oct. 13, 2016.
Korean Patent Office, Notice of Final Rejection, Application No. 10-2016-7026279 dated Oct. 27, 2016.
Korean Patent Office, Notice of Final Rejection, Application No. 10-2016-7002561 dated Feb. 11, 2017.
Korean Patent Office, Notice of Final Rejection, Application No. 10-2016-7002561 dated Dec. 12, 2016.
European Patent Office, Decision to Refuse a European Patent Application, Application No. 09790414 dated Dec. 13, 2016.
United States Patent and Trademark Office, Office Action, U.S. Appl. No. 14/198,884 dated Dec. 19, 2016.
Korean Patent Office, Notice of Preliminary Rejection, Application No. 10-2016-7002451 dated Jan. 6, 2017.
Japanese Patent Office, Decision of Rejection, Application No. JP 2014-087038 dated Jan. 17, 2017.
European Patent Office, Communication pursuant to Article 94(3) EPC, Application No. 09790404 dated Feb. 7, 2017.
Japanese Patent Office, Office Action, Application No. JP 2016-039643 dated Nov. 29, 2016.
Korean Patent Office Application No. 10-2017-7006891, Second Notice of Final Rejection dated Feb. 6, 2018, 7 pages.
U.S. Appl. No. 14/198,884 , "Final Office Action", dated Mar. 8, 2018, 17 pages.
U.S. Appl. No. 15/443,482 , "Non-Final Office Action", dated Mar. 8, 2018, 45 pages.
EP 14151307.7, "Communication Pursuant to Article 94(3) EPC", dated Mar. 9, 2018, 9 pages.
EP 14151328.3, "Communication Pursuant to Article 94(3) EPC", dated Mar. 9, 2018, 8 pages.
JP 2017-097611, "Office Action", dated Mar. 27, 2018, 4 pages.
KR 10-2018-7006662, Notice of Preliminary Rejection, dated Apr. 24, 2018, 12 pages.

* cited by examiner

SYSTEMS AND METHODS FOR HAPTIC MESSAGE TRANSMISSION

CROSS-REFERENCES TO RELATED APPLICATIONS

This patent application claims priority to: U.S. Provisional Patent Application No. 61/080,978, entitled "Systems and Methods for Physics-Based Tactile Messaging" filed Jul. 15, 2008; U.S. Provisional Patent Application No. 61/080,981, entitled "Systems and Methods for Mapping Message Contents to Virtual Physical Properties for Vibrotactile Messaging" filed Jul. 15, 2008; U.S. Provisional Patent Application No. 61/080,985, entitled "Systems and Methods for Shifting Sensor Haptic Feedback Function Between Passive and Active Modes" filed Jul. 15, 2008; U.S. Provisional Patent Application No. 61/080,987, entitled "Systems and Methods for Gesture Indication of Message Recipients" filed Jul. 15, 2008; U.S. Provisional Patent Application No. 61/148,312, entitled "Systems and Methods for Pseudo-Telepresence in a Shared Space" filed Jan. 29, 2009; and U.S. Provisional Patent Application No. 61/181,280, entitled "Systems and Methods for Transmitting Haptic Messages" filed May 26, 2009, the entirety of all of which are hereby incorporated by reference.

FIELD OF THE INVENTION

The present invention generally relates to messaging systems and, more particularly, to systems and methods for haptic message transmission.

BACKGROUND

Conventional messaging systems may utilize a multi-step process for selecting a message recipient and sending a message. A user may have to navigate several menus to select a recipient and send a message. Furthermore, no information about how the message is sent, such as how the send button was pressed, is preserved. Accordingly, there is a need for systems and methods for haptic message transmission.

SUMMARY

Embodiments of the present invention provide systems and methods for haptic message transmission. For example, in one embodiment, a method for haptic message transmission comprises receiving a sensor signal from a sensor configured to sense a physical interaction with a messaging device, determining a virtual force based at least in part on the sensor signal, and applying the virtual force to a virtual message object within a virtual message environment. In another embodiment, a computer-readable medium comprises program code for carrying out such a method.

These illustrative embodiments are mentioned not to limit or define the invention but rather to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
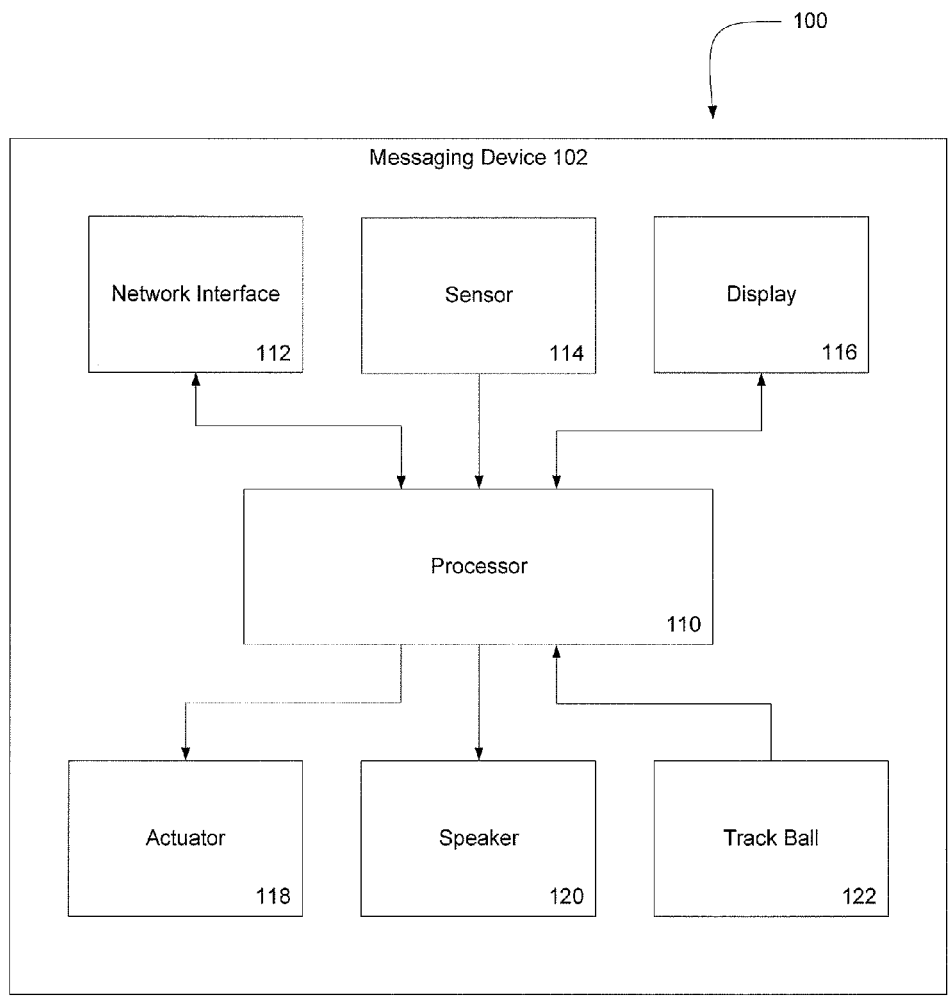
FIG. 1 is a block diagram of a system for haptic message transmission according to one embodiment of the present invention.

Embodiments of the present invention provide systems and methods for haptic message transmission.

Illustrative Embodiment of Haptic Message Transmission

One illustrative embodiment of the present invention comprises a messaging device such as a mobile phone. In the illustrative embodiment, the messaging device comprises the Samsung SGH-i710 mobile computer equipped with Immersion Corporation's VibeTonz® vibrotactile feedback system. In another embodiment, the messaging device comprises Immersion Corporations TouchSense® Technology system also known as Immersion TouchSense® vibrotactile feedback system. Other messaging devices and haptic feedback systems, may be utilized.

The messaging device comprises a display, a user interface device, memory, and a processor in communication with each of these elements. The display comprises a touch-sensitive display, or a touch-screen. The illustrative messaging device also comprises a sensor and an actuator, both of which are in communication with the processor. The sensor is configured to sense a user's physical interaction with the messaging device, and the actuator is configured to output a haptic effect to the user.

In the illustrative embodiment, a multi-dimensional message inbox in the form of a virtual message environment is shown on the display. The virtual message environment contains electronic messages represented as virtual message objects. A virtual message object may take the form of: a scroll, a capsule, a ball, a balloon, or any other object that the display is capable of displaying. Each type of virtual message object may correspond to a specific type of message. For example, virtual message objects in the form of a tube or a cylindrical scroll may represent text messages or chat conversations. A short message intended to convey emotion, such as intimacy, may be represented as a virtual message object in the form of a heart. The virtual message environment also comprises a virtual gateway. Virtual message objects may enter or leave the virtual message environment through the virtual gateway.

With the illustrative device, users can interact with the virtual message environment and/or virtual message objects by using the touch-screen and/or by manipulating the messaging device, for example, by rotating or shaking the device. Through such interactions, users can create, manipulate, send, and/or receive virtual message objects. In the illustrative device, a user makes a gesture directed toward the virtual gateway to transmit a virtual message object. Example gestures include: engaging the touch-screen and dragging or flicking a virtual message object toward a virtual gateway, tilting the messaging device in the direction of the virtual gateway, or shaking the virtual messaging device.

The sensor detects the user's gesture and, based on this gesture, sends a sensor signal to the processor. The sensor may comprise: a gyroscope, an accelerometer, a GPS, or other sensor capable of detecting movement. The sensor may be configured to detect when a user moves or tilts the device. Based at least in part on the sensor signal, the processor determines a virtual force that will act on a virtual message object. For example, when the device is tilted, the processor may determine a virtual force representing gravity, and move the virtual message object in the direction the device is tilted. As another example, a sensor may detect that the device has been jabbed or thrust toward a virtual gateway. The sensor will then send a corresponding signal to the processor, which may then determine a virtual force and apply it to the virtual message object.

After receiving a sensor signal, the processor determines a transmission characteristic of a virtual message object based, at least in part, on the sensor signal. In the illustrative embodiment, a transmission characteristic comprises a characteristic or property associated with the user's gesture or how the virtual message object was sent through the virtual gateway. This transmission characteristic is preserved and may be included as a part of the message. In one example, a user sends an urgent message by forcefully pushing the virtual message object through the virtual gateway. The transmission characteristic of the virtual message object will comprise its velocity as it passed through the virtual gateway. In another example, after a user slowly drags or flicks a virtual message object toward the virtual gateway, the processor determines a slow transmission characteristic. Additionally, the processor may determine other transmission characteristics based on the sensor signal, such as an approach angle transmission characteristic based on the angle of the user's gesture. The processor then includes the virtual transmission characteristic as a part of the virtual message object.

Next, the processor determines whether to transmit the virtual message object based, at least in part, on the virtual force. This determination may include a calculation of whether the gesture was sufficiently directed toward the virtual gateway. If a gesture is not directed toward the virtual gateway, the processor may determine that the virtual message object should not be transmitted but rather should stay inside the local virtual message environment. If the gesture is sufficiently directed toward the virtual gateway, the processor will determine that the virtual message object should be transmitted.

Finally, the processor transmits the virtual message object, as well as the transmission characteristic. The processor may send the virtual message object and the transmission characteristic to a network interface, such as a cellular network interface or a Wi-Fi network interface. The network interface then transmits the virtual message object and the transmission characteristic over a network, such as a cellular network, intranet, or the Internet, to another messaging device.

When the virtual message object is received its transmission characteristic may be preserved and interpreted by the receiving messaging device. In the illustrative embodiment, the user's indicative gesture comprises a fast flick toward the virtual gateway. A fast transmission characteristic is determined by the processor and transmitted along with the virtual message object. Then, when the virtual message object is received, the recipient device displays the virtual message object entering its graphical user interface through a virtual gateway. The virtual message travels through the receiving device's virtual gateway with a velocity and haptic effect corresponding to its transmission characteristic. In the illustrative embodiment, the message is sent with a fast flick, thus the receiving device's processor will determine a strong haptic effect, such as a heavy thud or a bounce. The processor may further determine a violent collision inside the virtual message environment when the message is received. In an alternative embodiment, if the virtual message object was sent with a gentle thrust or tilt, the virtual message object may arrive at a slower speed accompanied by a gentle haptic effect, such as a soft vibration.

This illustrative example is given to introduce the reader to the general subject matter discussed herein; the invention is not limited to this example. The following sections describe various additional embodiments and examples of methods and systems for haptic message transmission.

Haptic Message Transmission

Embodiments of the invention presented herein provide systems and methods for haptic message transmission. By incorporating a physical model into a virtual message environment, embodiments can leverage a user's everyday tactile experience and motor-sensory skills to intuitively navigate the user interface. Conventional messaging systems may provide little or no intuitive gesture navigation. Text messaging systems using a conventional email metaphor, with a one-dimensional inbox showing subject lines, drafts, etc., may be visually and cognitively intensive, requiring a user's heightened attention for creating, sending, and receiving messages. Further, conventional messaging systems may retain little or no contextual information associated with how a message was sent. Haptic message transmission, however, can facilitate non-linguistic communication of content by tying physical effects to a message.

In one embodiment, the messaging device's graphical user interface displays a virtual message environment. This virtual message environment incorporates a physical model, which allows users to directly manipulate its contents. The virtual message environment comprises electronic messages which are displayed as virtual message objects. A virtual message object may take the form of a ball, a scroll, a capsule, an arrow, a heart, or other shape. Users can manipulate virtual message objects and the virtual message environment, through motions or gestures detected by various sensors. These sensors may comprise one or more of a gyroscope, GPS, accelerometer, touch-screen, or other sensor configured to detect motion. The user's gestures or movements are translated into virtual forces acting on virtual message objects. These forces may cause the virtual message objects to move and collide inside the virtual message environment or to exit the environment through a virtual gateway.

Further, using a physical modeling engine, virtual boundaries may be programmed to correspond to the physical boundaries of the screen of the device. In such an environment, a virtual message object can bounce against the boundaries of the virtual message environment without traveling off the screen. A virtual gateway in the environment may be created by replacing part of the virtual physical boundary with a gateway or portal to one or more recipients. When a virtual object moves through the virtual gateway, it is transmitted to one or more recipient devices, and "leaves" the host's virtual message environment. Additionally, the virtual gateway may be closed, disabling the ability to send messages and keeping unsent messages in the virtual message environment. Thus, embodiments of the present invention may utilize a spatial metaphor for sending messages, thereby facilitating a more intuitive messaging process.

In some embodiments, a user may move a virtual message object through the virtual gateway by making an indicative gesture toward the virtual gateway. The gesture may be made by contacting the virtual message object on the touch-screen, moving the entire messaging device, or through some other means. In one example, a user sends a virtual message object by selecting it on the touch-screen and using a flicking gesture to move the object toward the virtual gateway. The processor may determine a transmission characteristic, such as the speed of the virtual message object as it travels through the virtual gateway. The transmission characteristic may be preserved as the virtual message object is transmitted to another messaging device. When the virtual message object is received by a recipient device, it may arrive in the virtual message environment and behave or interact with other objects and/or the environment based, at least in part, on its transmission characteristic.

Illustrative Systems for Haptic Message Transmission

Referring now to the drawings in which like numerals indicate like elements throughout the several figures, FIG. 1 is a block diagram of a system for haptic message transmission according to one embodiment of the present invention. As shown in FIG. 1, the system 100 comprises a messaging device 102, such as a mobile phone, portable digital assistant (PDA), portable media player, or portable gaming device. The messaging device 102 comprises a processor 110 in communication with a network interface 112, a sensor 114, a display 116, an actuator 118, a speaker 120, and a track ball 122.

The processor 110 is configured to generate a graphical user interface which is shown on display 116. Processor 110 is in communication with network interface 112, which may comprise one or more methods of mobile communication, such as infrared, radio, Wi-Fi, or cellular network communication. In other variations, network interface 112 comprises a wired network interface, such as Ethernet. The messaging device 102 can be configured to exchange messages or virtual message objects with other devices (not shown in FIG. 1) via network interface 112. Embodiments of messages exchanged between devices may comprise voice messages, text messages, data messages, or other types of messages.

The processor 110 is also in communication with one or more sensors 114. Sensor 114 may comprise a position sensor, location sensor, rotational velocity sensor, image sensor, pressure sensor, or other type of sensor. For example, sensor 114 may comprise an accelerometer, a gyroscope, a GPS sensor, a touch-sensitive input device (e.g. touch screen, touch-pad), or some other type of sensor. The one or more sensors 114 may be configured to detect changes in, for example, acceleration, inclination, inertia, or location. For example, the messaging device 102 may comprise an accelerometer 114 configured to measure acceleration of the messaging device 102. The one or more sensors 114 are configured to detect a user interaction and send a signal representing the user interaction to processor 110. The messaging device 102 may comprise additional forms of input, such as track ball 122, buttons, keys, a scroll wheel, and/or a joystick (not shown in FIG. 1).

Users may interact with the user interface through movements or gestures, which are detected by the one or more sensors 114. As the messaging device 102 is tilted, shaken, thrust, or otherwise moved, the one or more sensors 114 detect these movements. The sensors 114 generate sensor signals based, at least in part, on the movements and send those signals to processor 110. The signals may comprise one or more of: angle of the movement, speed of the movement, distance covered by the movement, or X-Y orientation of the movement. In one embodiment, an accelerometer sensor is configured to detect the inclination and acceleration of the messaging device 102. As the messaging device 102 is tilted, an accelerometer can be configured to send signals to the processor 110 based, at least in part, on the tilt and/or acceleration of the messaging device 102.

Signals received from the sensor 114 may be associated with an interaction with the graphical user interface shown on display 116. In one embodiment, a sensor signal comprises an indicative gesture oriented toward a virtual gateway in a virtual message environment. For example, an indicative gesture may comprise a poking motion which moves the messaging device 102 in a certain direction. An accelerometer 114 may detect the poking motion and send a sensor signal to the processor 110 representing the motion. As another example, an indicative gesture may comprise dragging or flicking a virtual message object toward a virtual gateway. A touch-screen display 116 may detect the drag or flick and send a representative sensor signal to the processor 110.

In the embodiment shown in FIG. 1, processor 110 is also in communication with display 116, which is configured to display a graphical user interface. Display 116 may comprise a touch-sensitive input device, such as a touch-screen, configured to send/receive signals to/from processor 110. The graphical user interface shown on the touch-screen display 116 facilitates the user's interaction with messages. The graphical user interface comprises a virtual message environment, in which messages are represented as virtual message objects. A virtual message object may be selected and manipulated by contacting it directly via touch-screen display 116. In one mode of interaction, two-dimensional finger gestures on a touch screen display may select, drag, flick, throw, and/or move a virtual object within the virtual message environment.

Signals received from a touch-screen display 116 may be associated with a transmission characteristic of a virtual message object in a graphical user interface. In one variation, a predetermined gesture on touch-screen 116, such as flicking or dragging a virtual message object, may be associated with a transmission characteristic, such as speed and/or angle of transmission of the virtual message object. In one embodiment, a quick flick is associated with a fast transmission characteristic of a virtual message object. In another embodiment, a slow drag is associated with a slow transmission characteristic.

The processor 110 may determine a haptic feedback effect based, at least in part, on a virtual message object's transmission characteristic. In one variation, a user indicates that a virtual message object should be sent to another user by quickly jabbing the messaging device 102 in the direction of a virtual gateway. Based on the quick jab, processor 110 determines a fast transmission characteristic and that the virtual message object should be transmitted. Then the processor 110 determines a haptic effect, such as a quick vibration, based at least in part on the fast transmission characteristic. Finally, processor 110 transmits a haptic signal representing the haptic effect to actuator 118.

As shown in FIG. 1, the processor 110 is also in communication with one or more actuators 118. Actuator 118 is configured to receive a haptic signal from processor 110 and output a haptic effect. After processor 110 determines a haptic effect, it sends a haptic signal to actuator 118. The haptic signal is configured to cause actuator 118 to output the determined haptic effect. Actuator 118 may be, for example, a piezoelectric actuator, an electric motor, an electromagnetic actuator, a voice coil, a linear resonant actuator, a shape memory alloy, an electro-active polymer, a solenoid, an eccentric rotating mass motor (ERM) or a linear resonant actuator (LRA).

Processor 110 is also in communication with a track ball 122. Processor 110 may receive signals representing user interaction from track ball 122. For example, track ball 122 may be used to scroll or navigate through a menu of message recipients in an address book. After a recipient has been selected, the track ball may be pressed to confirm the selection of a recipient. When the track ball 122 is pressed, a virtual gateway associated with the selected recipient, may be displayed in the virtual message environment. When a virtual gateway is displayed, the processor 110 is ready to send the virtual message object to a particular recipient.

Figure 2:
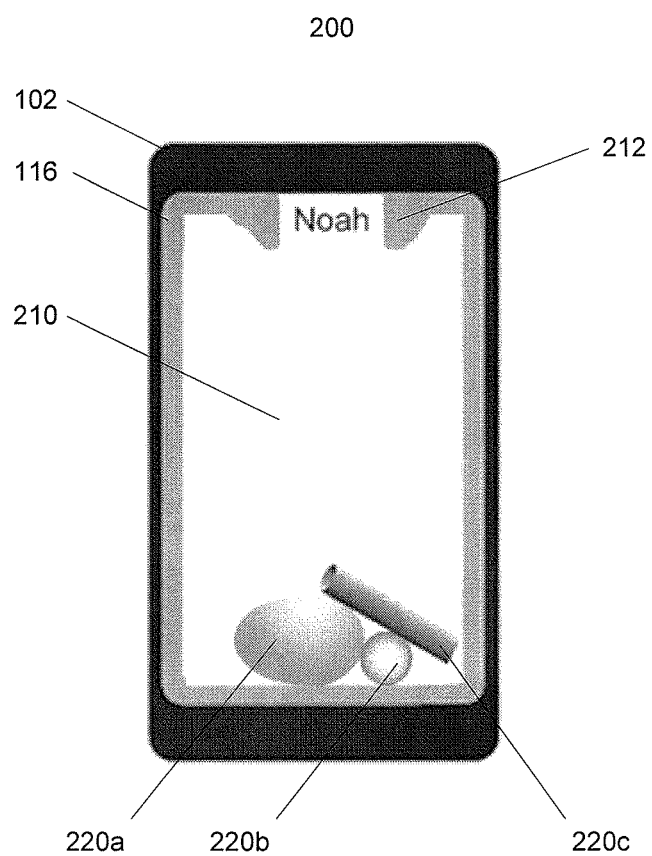
FIG. 2 is an illustration of a system for haptic message transmission according to one embodiment of the present invention.

FIG. 2 is an illustration of a system for haptic message transmission according to one embodiment of the present invention. The elements of system 200 are described with reference to the block diagram depicted in FIG. 1. A variety of implementations other than that shown in FIG. 1 are possible.

As shown in FIG. 2, system 200 comprises a messaging device 102, such as a mobile phone, PDA, portable media player, or portable gaming device. The messaging device 102 is configured to send and receive signals, such as voice mail, text messages, and other data messages, over a network such as a cellular network or the Internet. The mobile device 102 may comprise a wireless network interface and/or a wired network interface 112. Although the device 102 is illustrated as a handheld mobile device in FIG. 2, other embodiments may comprise different devices, such as video game systems and/or personal computers.

As shown in FIG. 2, the mobile device 102 comprises a display 116. In addition to display 116, the mobile device 102 may comprise buttons, a touchpad, a scroll wheel, a rocker switch, a joystick, or other forms of input devices (not shown in FIG. 2). Additionally, display 116 may comprise a touch-sensitive input device, such as a touch screen.

Display 116 is in communication processor 110. Display 116 is configured to display virtual message environment 210, and may comprise one or more virtual message objects. Virtual message objects may take the shape of any object display 116 is capable of showing. For example, virtual message objects may take the form of: arrows, balls, capsules, hearts, and tubes. As shown in FIG. 2, the virtual message environment 210 comprises three virtual message objects 220a, 220b, and 220c. Inside the virtual message environment 210, virtual message objects 220a, 220b, and 220c may move freely, bouncing and colliding with other virtual message objects and the boundaries of the virtual message environment 210.

Each virtual message object may represent a message and/or a file, such as a text message, a picture, a video, a voicemail, a reminder, or a pseudo-emotional message such as a smiley face or a frowning face The content of a virtual message object may be used determine the shape of the virtual message object. For example, a virtual message object in the form of a tube or a rolled-up scroll 220c may represent a text message. And a virtual message object in the form of an egg or a capsule 220a may represent a message with an attachment, such as a video file, a picture, or a song. Virtual message objects may also represent various forms of non-verbal communication, such as gestures, facial expressions, or emotions. For example, virtual message object 220b, shown as a ball, may correspond to a non-verbal message such as an indication of playfulness. A virtual message object represented as an arrow may represent a poke or a jabbing gesture (i.e. to request or demand attention). Other virtual message objects may appear as a heart, a basketball, a water balloon, a typewriter, or other shape that display 116 is capable of showing. Effective virtual message objects comprise easily identifiable visual and/or haptic properties and/or effects. For example, representing a work file with an image of a typewriter and including a haptic effect that represents the clanging of keys of a typewriter. Or representing an email as a bowling ball and including a haptic effect which represents a bowling ball hitting pins.

A virtual message object may comprise a data store defining characteristics of the virtual message object. These characteristics may include information regarding how the virtual message object interacts with other virtual message objects and the boundaries of the virtual message environment. For example, in one embodiment, a virtual message object may appear in the form of a rubber ball and include data which causes the ball to easily bounce off other virtual message objects. In another embodiment a virtual message object may appear in the form of an egg, and contain data which causes the egg to easily shatter if impacted by another virtual message object.

Representing messages as virtual message objects enables a user to quickly determine information about a message without opening it. In some embodiments, the size of a message corresponds to the size or mass of the virtual message object. A message with a large file attachment can be represented as a large or massive object. A message such as a short text message or a message with a small file attachment can be represented as a small virtual message object.

The virtual message environment 210 also comprises a virtual gateway 212. A virtual message object may be sent to other messaging devices by moving it through the virtual gateway 212. As a virtual message object moves through the virtual gateway 212, it is transmitted to a recipient device and "leaves" the local virtual message environment 210. Thus, embodiments of the invention may utilize a spatial metaphor for sending messages, facilitating a more intuitive process of sending messages.

The virtual gateway 212 may be displayed by replacing a section of the virtual message environment 210 with the virtual gateway 212. The virtual gateway 212 may comprise a visual indication of the recipient(s) it is directed toward. For example, the virtual gateway 212 may show the name of a selected recipient. In FIG. 2, "Noah" is shown as the potential recipient of a virtual message object sent through the virtual gateway 212. In another variation, a group of recipients, such as a "family" group or a "classmates" group may be shown in the virtual gateway 212. In such a variation, when a virtual message object is sent through a virtual gateway 212 indicating a recipient group, the virtual message object is sent to the messaging device of each individual in the group.

Illustrative Methods for Haptic Message Transmission

Figure 3:
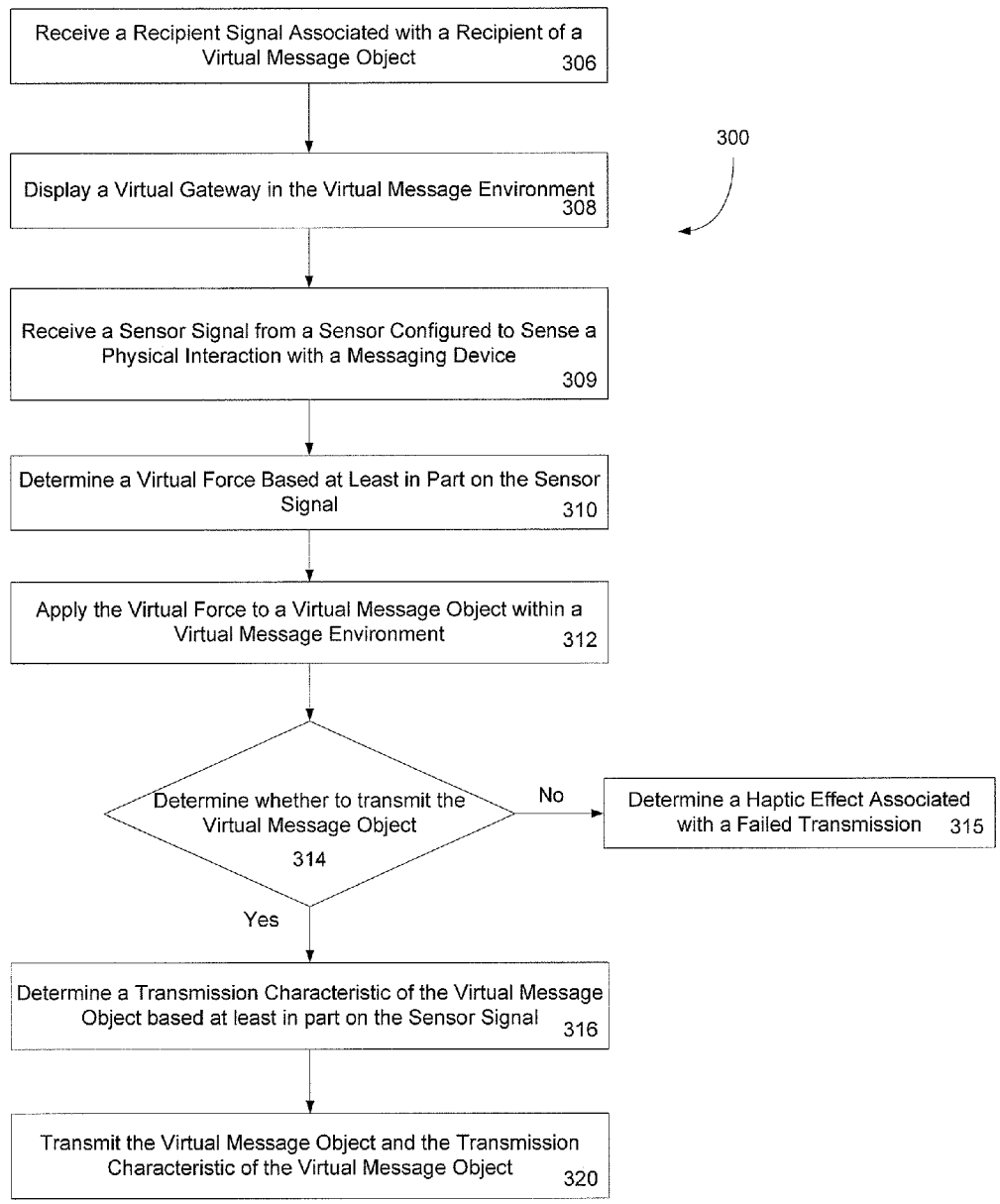
FIG. 3 is a flow diagram of a method for haptic message transmission according to another embodiment of the present invention.

FIG. 3 is a flow diagram of a method for haptic message transmission according to one embodiment of the present invention. While embodiments of the current invention may be utilized in a variety of devices, the process shown in FIG. 3 will be described in relation to the block diagram shown in FIG. 1 and the device shown in FIG. 2.

In method 300, at step 306, processor 110 receives a recipient signal associated with a recipient of the virtual message object. Processor 110 may receive a recipient signal from a button, scroll wheel, or other input device, such as track ball 122 or sensor 114. In one embodiment, processor 110 displays a sequential list of names from an address book stored in local memory. The names can be shown in the virtual message environment 210, for example, at the top or the bottom of the display 116. To scroll through the names, a left or right button is pressed. When the correct name for the intended recipient has been identified, the track ball 122 may be depressed to send a recipient signal to the processor 110. In one variation, a user may scroll through names in an address list by shaking the device in a left or right direction. With a small, soft shake, the processor 110 may progress through the address list by small increments, such as one or two names in either direction. With a large, violent shake, processor 110 may progress through the address list by larger increments, such as ten or twenty names in either direction.

A step 308, processor 110 displays virtual gateway 212 in the virtual message environment. Virtual Gateway 212 may be associated with the recipient of a virtual message object. For example, virtual gateway 212 may comprise a visual indication of a recipient by displaying the name of the recipient. In the event of a network failure, processor 110 may close the virtual gateway 212, yielding visual and/or haptic cues to the user that a virtual message object cannot be sent. In one variation, when processor 110 determines that a recipient cannot receive a virtual message object, the virtual message object may bounce against the virtual gateway 212 and remain in the virtual message environment 210. Once virtual gateway 212 has been established, a virtual message object may be sent to a recipient. The virtual message object may be sent with a gesture moving it toward the virtual gateway 212.

At step 309, processor 110 receives a sensor signal from a sensor configured to sense a physical interaction with a messaging device. The sensor may detect both a direction and magnitude of the user's interaction. For example, if a user jerks the messaging device away from her body, the sensor may detect both the speed with which the device was moved as well as the direction. In another example, the sensor signal may be associated with a user interaction wherein the user dragged a virtual message object toward virtual gateway 212. In this way the sensor signal may comprise a gesture directed toward the virtual gateway. In another example, the sensor signal may be associated with the messaging device 102 having been tilted.

At step 310, the processor 110 determines a virtual force based at least in part on the sensor signal. The processor may determine both a direction and a magnitude of the virtual force. For example, the force may be in a direction perpendicular to the mobile device and at a low intensity. In another example, if the mobile device is tilted, the processor may determine a force representing gravity pulling virtual objects in the direction the device was tilted. In other embodiments, the processor may determine a force that varies in direction or intensity over time.

Next, at step 312, the processor applies the virtual force to a virtual message object within a virtual message environment. The virtual message object will then move within the virtual message environment based, at least in part, on the magnitude and direction of the virtual force. The virtual message object's behavior may further be defined by data contained in a data store. This data defines characteristics of the virtual message object's interaction in the virtual message environment. For example, the virtual message object may be in the shape of an egg, and have a characteristic defining a brittle surface. Then, if a virtual force of a high magnitude is applied to the surface of the virtual message object, the object may crack. In another example, the virtual message object may have a characteristic which defines a solid ball. When a virtual force of high intensity is applied, the ball may roll in the direction of the virtual force.

Next, at step 314, the processor 110 determines whether to transmit the virtual message object. This determination may be based at least in part on the virtual force and a status of a recipient. Processor 110 may analyze the speed and angle of the force to determine if the virtual message object's trajectory will take it through the virtual gateway 212. If processor 110 determines that the trajectory will not carry the virtual message object through the virtual gateway 212, then processor 110 may determine not to transmit the virtual message object. But if the transmission characteristic of a virtual message object will carry it through the virtual gateway 212, then processor 110 may transmit the virtual message object. Additionally, processor 110 may determine whether to transmit the virtual message object based, at least in part, on the status of a recipient. For example, if the messaging device of a recipient is turned off or disconnected from the network, processor 110 may determine not to send the virtual message object. In another example, if the status of a recipient's messaging device is set to "hidden," processor 110 may determine not to send the virtual message object.

If at step 314, processor 110 determines that a virtual message object should not be transmitted, then processor 110 may determine a haptic effect associated with a failed transmission 315. For example, after processor 110 determines that a virtual message object should not be sent, it may determine a haptic effect simulating the virtual message object bouncing against the virtual gateway 212 and staying in the virtual message environment 210.

At step 316, processor 110 determines a transmission characteristic of the virtual message object based, at least in part, on the sensor signal. In one embodiment, the sensor signal is associated with a hurried or forceful gesture, so processor 110 determines a corresponding hurried or forceful transmission characteristic. In another embodiment, a sensor signal may be associated with a gentle or slow gesture; thus, processor 110 may determine a corresponding gentle or slow transmission characteristic.

In some embodiments, the sensor signal may be associated with an angle of transmission of a virtual message object. For example, a user may move a virtual message object toward the virtual gateway at an angle. In this case, the virtual message object travels through the virtual gateway at an angle; therefore, processor 110 may determine an angular transmission characteristic. Alternatively, if a user sends a virtual message object straight through the virtual gateway, the processor 110 may determine a straight transmission characteristic At step 320 the processor 110 transmits the virtual message object and the transmission characteristic of the virtual message object. In some embodiments, transmission will occur when the virtual message object passes through the virtual gateway 212. When a virtual message object is sent through the virtual gateway 212, the virtual message object may disappear from the local virtual message environment 210. The disappearance may occur at substantially the same time the virtual message object is transmitted across a network. If the virtual message object is not successfully transmitted to the recipient, it will remain in the virtual message environment 210. This provides the user with simple information regarding the status of the network connection or the status of the recipient device.

In one variation, when a virtual message object leaves the virtual message environment 210, processor 110 transmits a haptic signal to an actuator 118 alerting the user that the message has been successfully transmitted. For instance, processor 110 may determine a haptic effect that simulates an arrow hitting a wall.

Figure 4:
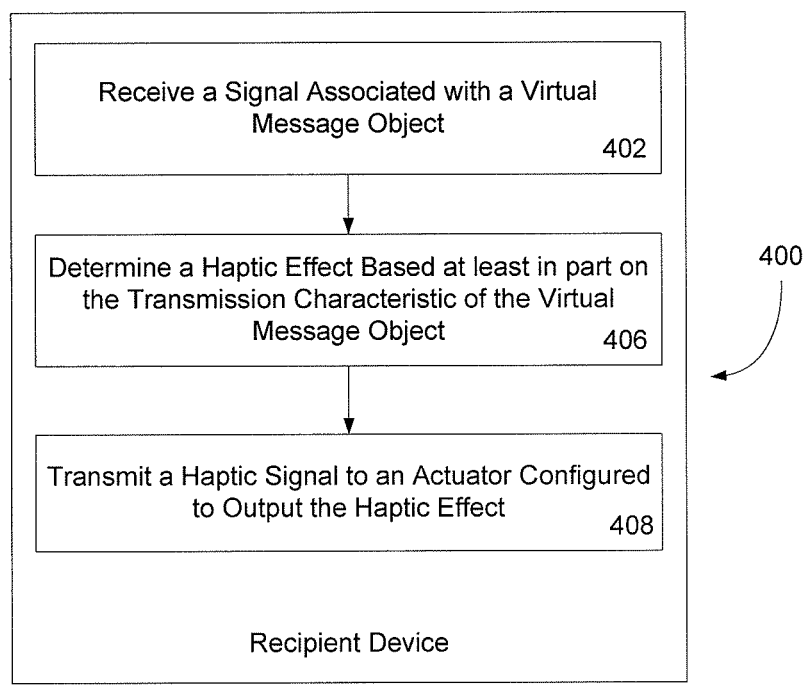
FIG. 4 is another flow diagram of a method for haptic message transmission according to another embodiment of the present invention.

FIG. 4 is a flow diagram of a method for haptic message transmission according to one embodiment of the present invention. FIG. 4 shows an embodiment wherein a virtual message object is received by a recipient messaging device.

In method 400, at step 402 the recipient device's processor receives a signal associated with a virtual message object. The signal may be received from a network interface which is communicatively connected to an external network such as a cellular network, intranet, or the Internet. For example, the signal may have been transmitted across a network by another messaging device connected to that network. The signal associated with the virtual message object comprises data defining the virtual message object's characteristics. For example the signal may comprise data defining characteristics such as a virtual message object's size, shape, transmission characteristic, data type, and contents.

At step 406, the recipient device's processor determines a haptic effect based at least in part on the transmission characteristic of the virtual message object. For example, if the sending messaging device was gently tilted toward a virtual gateway when the virtual message object was sent, the transmission characteristic may comprise a low speed. The recipient device's processor will then use that transmission characteristic to determine a haptic effect comprising a gentle vibration. The gentle vibration simulating to the recipient that the virtual message object has hit a boundary of the recipient virtual message environment at a low speed. In contrast, a haptic effect based on a high speed transmission characteristic may comprise a strong jolt, to simulate when the virtual message object arrives in recipient virtual message environment at a high speed.

Next, at step 408, the recipient device's processor transmits a haptic signal to an actuator configured to output the haptic effect. The actuator will then output a haptic effect based at least in part on this signal.

Illustrative Scenarios for Haptic Message Transmission

Figure 5B:
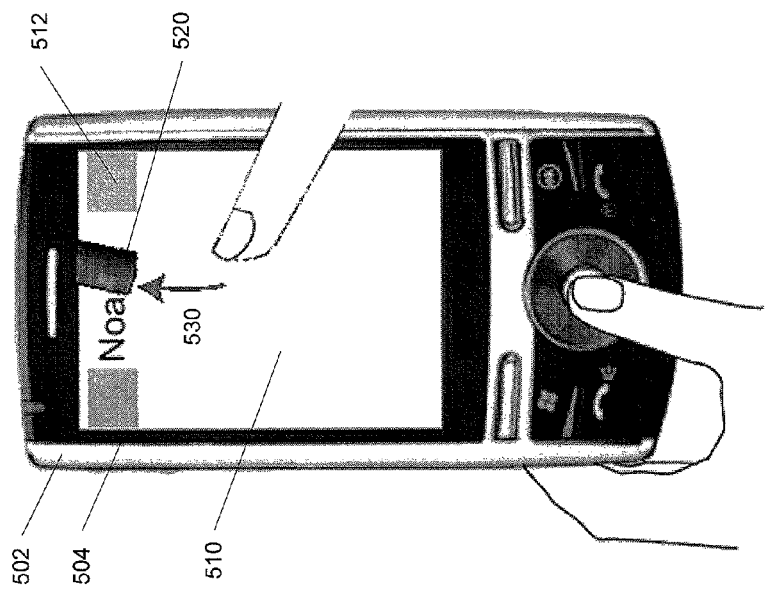
FIGS. 5a and 5b are illustrations of haptic message transmission according to an embodiment of the present invention.
Figure 5A:
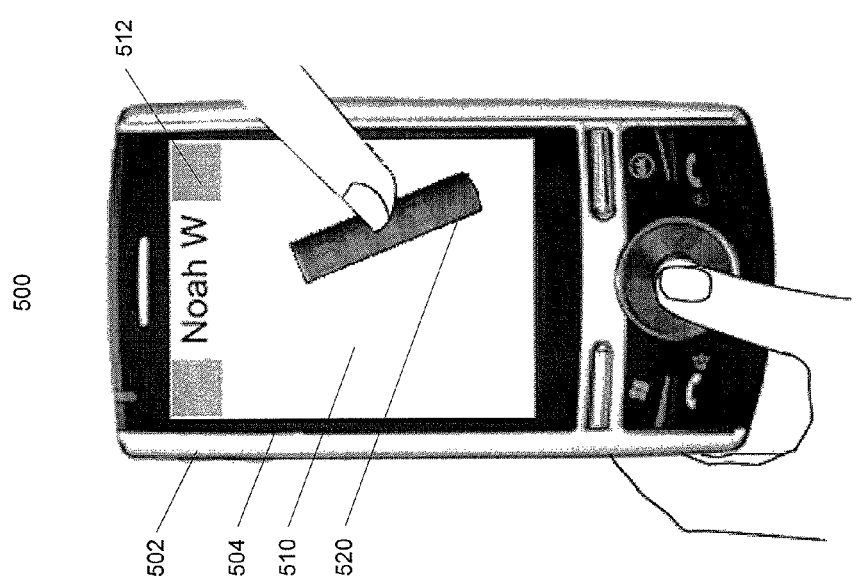

FIGS. 5a and 5b are illustrations of haptic message transmission according to one embodiment of the present invention. FIG. 5a comprises a messaging device 502 with a touch-screen display 504. The messaging device 502 also comprises a processor (not shown in FIGS. 5a and 5b), which generates a virtual message environment 510 shown on the touch-screen display 504. The virtual message environment 510 includes a virtual gateway. As shown in FIG. 5a, the virtual message environment also comprises a virtual message object 520; in this example, virtual message object 520 is in the form of a document tube or scroll.

Virtual gateway 512 may comprise an indication of a selected recipient. As shown in FIG. 5a, the recipient "Noah W" is indicated in the virtual gateway 512. In other scenarios, virtual gateway 512 may indicate a recipient comprising an Internet website, social networking site, blog, Twitter account, or some other network-enabled resource. In one such scenario, the recipient shown in the virtual gateway 512 may comprise a Twitter address. When a virtual message object 520 is sent through the virtual gateway 512, the virtual message object may be posted to the Twitter account. In another scenario, the virtual gateway 512 may be associated with a public or global virtual message environment. When a virtual message object 520 is sent through the virtual gateway 512, the virtual message object 520 may be posted in the global virtual message environment and thus be accessed by other users or browsers of the global message environment.

In FIG. 5a, a user engages the virtual message object 520 by interacting with it on the touch-screen display 504. By interacting with the virtual message object 520 through the touch-screen display 504, a virtual force may act on the virtual message object 520. In other variations, the virtual message object 520 may be moved via other means, for example by tilting the messaging device 502.

In FIG. 5b, the user has made an indicative gesture toward the virtual gateway 512 by dragging his or her finger across the touch-screen display 504 in the direction shown by arrow 530. The processor of messaging device 502 determines at least one transmission characteristic based on the user's gesture as detected by the touch-screen display 504. In FIG. 5b, the processor may determine a curving trajectory transmission characteristic corresponding to the slight curve of the user's gesture, as indicated by arrow 530. The curving trajectory transmission characteristic is transmitted to the receiving device. The receiving device may use this transmission characteristic to determine the behavior that virtual message object 520 will have in the receiving device's virtual message environment.

Figure 6A:
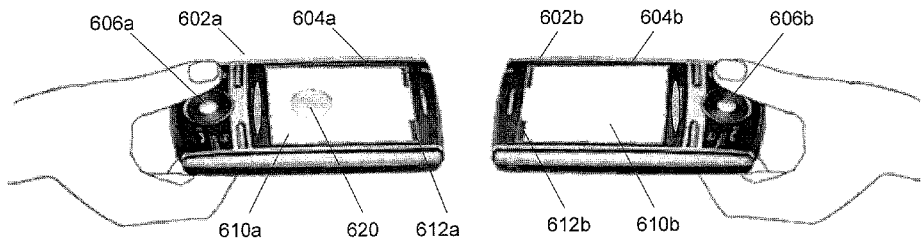
FIGS. 6a, 6b, 6c, and 6d are additional illustrations of haptic message transmission according to one embodiment of the present invention.

FIGS. 6a, 6b, 6c, and 6d are illustrations of haptic message transmission according to one embodiment of the present invention. In FIG. 6a, a messaging device 602a is in communication with another messaging device 602b. Each messaging device 602 comprises a touch-screen display 604. The touch-screen display 604a of the messaging device 602a is shown displaying a virtual message environment 610a with a virtual gateway 612a. The touch-screen display 604b of the second messaging device 602b is shown displaying a second virtual message environment 610b with a second virtual gateway 612b. A virtual message object 620 is shown inside the first virtual message environment 610a.

Figure 6B:
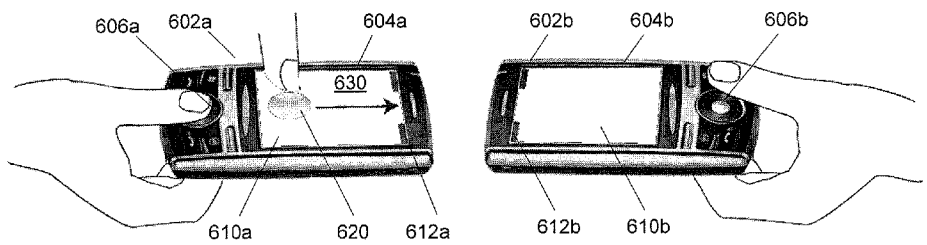

In FIG. 6b, a user engages the virtual message object 620 by dragging or flicking the object 620 across the touch-screen display 604a. As shown in FIG. 6b, the user may engage a function or shift key 606a to indicate that the user wishes to enter a "send" mode, thus opening the virtual gateway 612a. In order to send the virtual message object 620, the user may employ a gesture which pushes the virtual message object toward the virtual gateway 612a.

When the processor of the messaging device 602a receives a sensor signal associated with an indicative gesture toward the virtual gateway 612a, it may determine one or more transmission characteristics of the virtual message object 620 based at least in part on the sensor signal. In FIG. 6b the user flicks the virtual message object directly at the virtual gateway as shown by arrow 630. In this case, sensor 114 will detect the user interaction and send a signal to processor 110, which will use the signal to determine a straight transmission characteristic. After determining one or more transmission characteristics, the processor may send the virtual message object to a recipient indicated by the virtual gateway 612a.

Figure 6C:
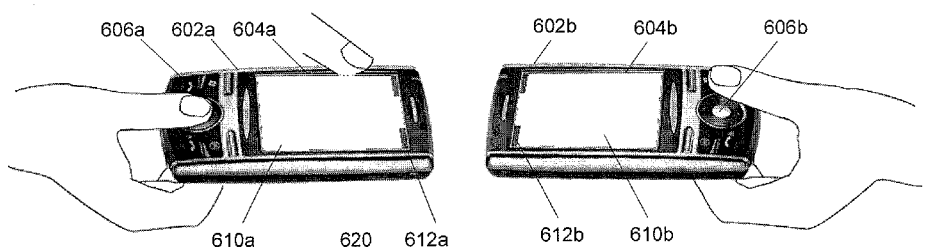

In FIG. 6c, the virtual message object 620 has left the sender's virtual message environment 610a and is being transmitted over a network to the virtual message environment 610b of the recipient messaging device 602b. The virtual message object may be sent over a cellular network, a public data network such as the Internet, a point-to-point network, or a private data network (i.e., an intranet). After the virtual message object 620 is sent through the virtual gateway 612a of the sending messaging device 602a, it disappears from the first virtual message environment 610a.

Figure 6D:
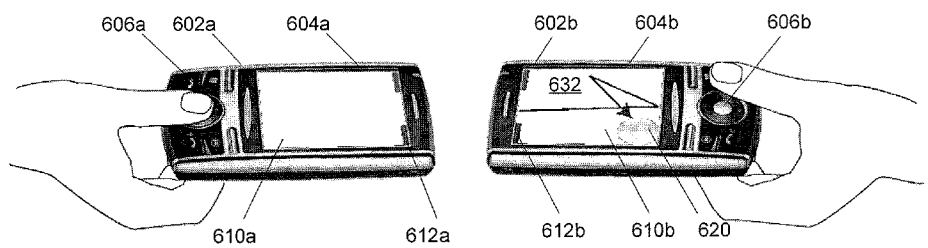

In FIG. 6d, the virtual message object 620 is received by the recipient messaging device 602b. A processor of the recipient messaging device 602b may receive a signal associated with the virtual message object 620 and a transmission characteristic of the virtual message object 620, such as the speed at which the virtual message object was sent through the first virtual gateway 612a. Then the virtual message object 620 will be displayed in the second virtual message environment 612b. The behavior of the virtual message object in the second virtual message environment 612b may be based at least in part on the transmission characteristic.

In the embodiments shown in FIG. 6d, the recipient device 602b has recreated the virtual message object 620 sent from the sending device 602a. As part of the recreation, the processor may determine a behavior or property of the virtual message object 620 inside the receiving virtual message environment 610b based at least in part on the transmission characteristic. For example, if the virtual message object 620 is sent from the sending device 602a by a quick, forceful gesture, the virtual message object 620 may arrive in the virtual message environment 610b, of the receiving device 602b with a corresponding speed. Once it enters the receiving virtual message environment 610b virtual message object 620 may interact with other virtual message objects and the boundaries of virtual message environment 610b. For example, virtual message object 620 may be reflected off the boundaries of the virtual message environment 602b as indicated by arrow 632.

Figure 7A:
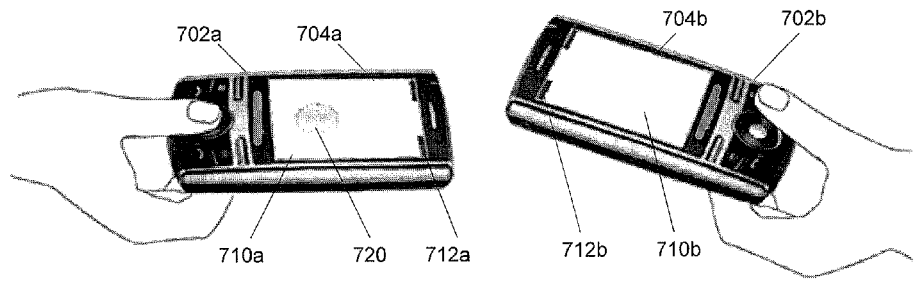
FIGS. 7a, 7b, 7c, and 7d are additional illustrations of haptic message transmission according to one embodiment of the present invention.

FIGS. 7a, 7b, 7c, and 7d are illustrations of haptic message transmission according to one embodiment of the present invention. In FIG. 7a, messaging device 702a is in communication with a second messaging device 702b. Each messaging device comprises a virtual message environment 710, shown on a touch-screen display 704. The first touch-screen display 704a of the first messaging device 702a is shown displaying a virtual message environment 710a with a virtual gateway 712a. The touch-screen display 704b of the second messaging device 702b is shown displaying a second virtual message environment 710b with a second virtual gateway 712b. A virtual message object 720 in the form of a ball is shown inside the first virtual message environment 710a.

Figure 7B:
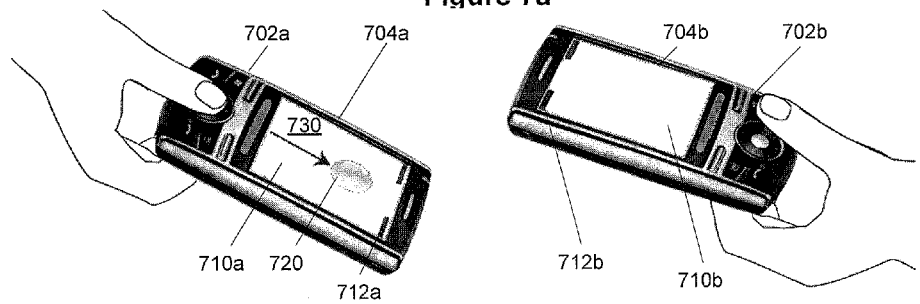

In one embodiment of a haptic message transmission system, when a device is tilted in one direction, virtual message object 720 located within virtual message environment 710a or 710b may react by rolling, sliding, or otherwise moving in a direction corresponding to the tilt of the device. In FIG. 7b, a user makes an indicative gesture toward the virtual gateway 712a by tilting the first messaging device 702a toward the first virtual gateway 712a. A sensor detects the angle at which the device is tilted and sends a signal to the processor of messaging device 702a. By tilting device 702a downward, the virtual message object 720 responds by rolling or moving in the direction of arrow 730 toward the first virtual gateway 712a. In this manner, a spatial metaphor is used so that the device gives users the sensation that they are sending virtual message objects in the direction of their recipients.

In some embodiments, the display may further comprise a direction arrow or compass (not shown in FIG. 7). The direction arrow or compass points in the physical direction of the intended recipient; thus, further utilizing a spatial metaphor for message transmission. In such an embodiment, for example, a user may send a message to a user that is North of their location. In such an embodiment, the sender's display will display a direction arrow pointing North, indicating that the intended recipient is North of the sender.

As illustrated in FIG. 7b, tilting device 702a downward comprises a gesture which directs virtual message objects toward virtual gateway 712a. In contrast, tilting the device 702a to either side or away from the virtual gateway 712a may comprise a gesture which directs virtual message objects away from virtual gateway 712a. Upon receiving a sensor signal, the processor may determine whether to transmit the virtual message object 720 based, at least in part, on whether the sensor signal comprises a gesture toward or away from the virtual gateway 712a.

In addition to determining whether to transmit virtual message object 720, the processor may also determine a transmission characteristic of the virtual message object 720, such as velocity, based at least in part on the sensor signal. For example, if device 702a is tilted toward the virtual gateway 712a at a small angle, the processor may determine a slow velocity transmission characteristic. As another example, if the device 702a is tilted toward the virtual gateway 712a at a steep angle, the processor may determine a fast velocity transmission characteristic.

As the first device 702a is tilted toward the virtual gateway 712a, the virtual message object 720 rolls toward the virtual gateway 712a in the direction shown by arrow 730 in FIG. 7b. Eventually, the virtual message object 720 may roll through the first virtual gateway 712a and leave the first virtual message environment 710a. After the virtual message object 720 travels through the first virtual gateway 712a, the processor of the first messaging device 702a may transmit the virtual message object 720 to the recipient messaging device 702b.

Figure 7C:
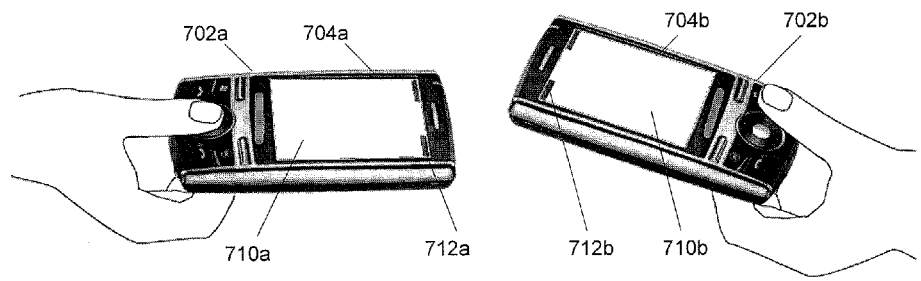

In FIG. 7c, the processor of the first messaging device 702a has transmitted the virtual message object 720 and its transmission characteristic over the network. The virtual message object 720 no longer appears in the first virtual message environment 710a of the first messaging device 702a, but has yet to be received by messaging device 702b. Because the transmission characteristic is transmitted with virtual message object 720, the receiving device may determine the speed and direction with which virtual message object 720 was sent. For example, if the virtual message object 720 was hastily "thrown" or "pushed" through the virtual gateway of the sending device, receiving device 702b may determine that virtual message object 720 should arrive with corresponding speed. Thus, the virtual message object may arrive through the virtual gateway 712b and into the recipient virtual message environment with characteristics corresponding to the way it was sent.

Figure 7D:
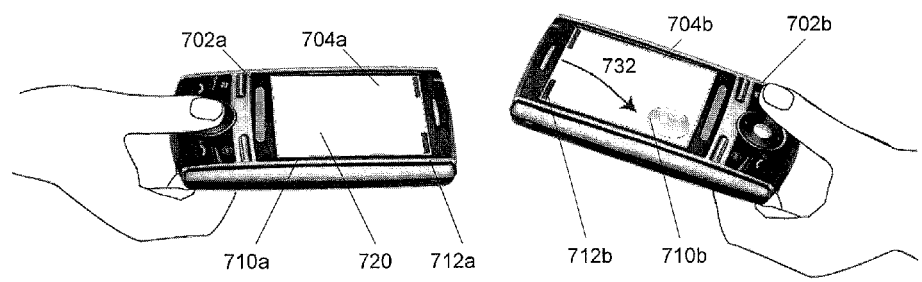

In FIG. 7d, the virtual message object 720 has been received by the recipient mobile device 702b. In the illustration, the virtual message object 720 is shown as falling through the virtual gateway 712b at the top of the second virtual message environment 710b and hitting the bottom of the second virtual message environment 710b. Because the transmission characteristic may be preserved and transmitted with the virtual message object 720, the virtual message object 720 may arrive in the same fashion as it was sent. For example, if the sending messaging device was slowly tilted toward the first virtual gateway 712a, the object may arrive through the second virtual gateway 712b with a gentle vibration. Conversely, if the sending mobile device was jerked in the direction of the first virtual gateway 712a, the virtual message object 720 may arrive in the second virtual gateway 712b with a hard jolt, rebound, or bounce vibration.

The speed and trajectory of the virtual message object 720 may result in the virtual message object 720 bouncing or shattering against the walls of the receiving virtual message environment 710b. In FIGS. 7a, 7b, and 7c, the virtual message environment 710b of the recipient device 702b is empty. When the virtual message object 720 is received by the recipient device 702b, the speed and trajectory transmission characteristics of the virtual message object 720 result in it falling to the bottom of the receiving virtual message environment 710b in the direction indicated by arrow 732. When virtual message object 720 enters messaging device 702b, it may output haptic effects corresponding to the interaction between virtual message object 720 and virtual message environment 710b.

Computer Readable Medium for Haptic Message Transmission

Embodiments of the present invention can be implemented in digital electronic circuitry, or in computer hardware, firmware, software, or in combinations of these technologies. In one embodiment, a computer may comprise a processor or processors. The processor comprises a computer-readable medium, such as a random access memory (RAM) coupled to the processor. The processor executes computer-executable program instructions stored in memory, such as executing one or more computer programs for messaging. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise or be in communication with media, for example computer-readable media, which stores instructions that, when executed by the processor, cause the processor to perform the steps described herein as carried out or facilitated by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor and the processing described may be in one or more structures and may be dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive nor to limit the invention to the precise forms disclosed. Numerous modifications and adaptations thereof will be apparent to those skilled in the art without departing from the spirit and scope of the invention.

That which is claimed is:

1. A method comprising:
receiving a sensor signal from a sensor configured to sense a physical interaction with a messaging device;
determining a virtual force based at least in part on the sensor signal;
applying the virtual force to a virtual message object within a virtual message environment, the virtual force configured to move the virtual message object toward a virtual gateway, the virtual gateway and the virtual message object each comprising graphical elements displayed to a user in the virtual message environment;
determining a transmission characteristic of the virtual message object based at least in part on the sensor signal, wherein the transmission characteristic is associated with the physical interaction that sent the virtual message object through the virtual gateway;
determining a haptic effect based in part on the transmission characteristic; and
transmitting the virtual message object and the transmission characteristic of the virtual message object.

2. The method of claim 1, further comprising determining whether to transmit the virtual message object.

3. The method of claim 2, wherein determining whether to transmit the virtual message object is based at least in part on the virtual force and a status of a recipient.

4. The method of claim 1, further comprising:
receiving a recipient signal associated with a recipient of the virtual message object.

5. The method of claim 4, wherein the virtual gateway is associated with the recipient of the virtual message object.

6. The method of claim 4, wherein the sensor signal comprises a gesture directed toward the virtual gateway.

7. A method comprising:
receiving a signal associated with a transmission characteristic, the transmission characteristic associated with sending a virtual message object, wherein the transmission characteristic is also associated with a physical interaction that sent the virtual message object through a virtual gateway, the virtual gateway and the virtual message object each comprising graphical elements displayed to a user in a virtual message environment; and
determining a haptic effect based, at least in part, on the transmission characteristic of the virtual message object.

8. The method of claim 7, further comprising transmitting a haptic signal to an actuator configured to output the haptic effect.

9. A non-transitory computer-readable medium comprising program code, which is configured, when executed by a processor, to cause the processor to:
receive a sensor signal from a sensor configured to sense a physical interaction with a messaging device;
determine a virtual force based at least in part on the sensor signal;
apply the virtual force to a virtual message object within a virtual message environment;
determine a transmission characteristic of the virtual message object based at least in part on the sensor signal, wherein the transmission characteristic is associated with the physical interaction that sent the virtual message object through a virtual gateway, the virtual gateway and the virtual message object each comprising graphical elements displayed to a user in the virtual message environment;
determine a haptic effect based in part on the transmission characteristic; and
transmit the virtual message object and the transmission characteristic of the virtual message object.

10. The computer-readable medium of claim 9, further comprising program code, which is configured, when executed by a processor, to cause the processor to determine whether to transmit the virtual message object.

11. The computer-readable medium of claim 9, further comprising program code, which is configured, when executed by a processor, to cause the processor to receive a recipient signal associated with a recipient of the virtual message object.

12. A non-transitory computer-readable medium comprising program code, which is configured, when executed by a processor, to cause the processor to:
receive a virtual message object and a transmission characteristic associated with a physical interaction that sent the virtual message object through a virtual gateway, the virtual gateway and the virtual message object each comprising graphical elements displayed to a user in a virtual message environment; and
determine a haptic effect based, at least in part, on the transmission characteristic.

13. The computer readable medium of claim 12, further comprising program code, which is configured, when executed by a processor, to cause the processor to transmit a haptic signal to an actuator configured to output the haptic effect.

14. A system comprising:
a processor configured to:
receive a sensor signal from a sensor configured to sense a physical interaction with a messaging device;
determine a virtual force based at least in part on the sensor signal; and
apply the virtual force to a virtual message object within a virtual message environment;
determine a transmission characteristic of the virtual message object based at least in part on the sensor signal, wherein the transmission characteristic is associated with the physical interaction that sent the virtual message object through a virtual gateway, the virtual gateway and the virtual message object each comprising graphical elements displayed to a user in the virtual message environment;
determine a haptic effect based in part on the transmission characteristic;
transmit the virtual message object and the transmission characteristic of the virtual message object;
a network interface in communication with the processor; and
a display in communication with the processor, the display configured to display the virtual message environment.

15. The system of claim 14, wherein the processor is further configured to determine whether to transmit the virtual message object.

16. The system of claim 14, wherein the sensor comprises: a pressure sensor, a gyroscopic sensor, an accelerometer, or a touch sensitive input device.

17. The system of claim 14, wherein the haptic effect is configured to simulate a collision in the virtual message environment.

18. A system comprising a recipient device, the recipient device comprising:
a processor configured to:
receive a signal associated with a transmission characteristic the transmission characteristic associated with sending a virtual message object, wherein the transmission characteristic is also associated with a physical interaction that sent the virtual message object through a virtual gateway, the virtual gateway and the virtual message object each comprising graphical elements displayed to a user in a virtual message environment; and
determine a haptic effect based at least in part on the transmission characteristic of the virtual message object.

19. The system of claim 18, wherein the processor is further configured to transmit a haptic signal to an actuator configured to output a haptic effect.

20. The system of claim 18, wherein the haptic effect is configured to simulate a collision in the virtual message environment.

* * * * *